US008448055B2

(12) United States Patent
Wu

(10) Patent No.: US 8,448,055 B2
(45) Date of Patent: May 21, 2013

(54) METHODS AND APPARATUSES FOR PERFORMING ERROR DETECTION AND ERROR CORRECTION FOR SYNCHRONIZATION FRAME

(75) Inventor: Yuchun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1006 days.

(21) Appl. No.: 12/488,341

(22) Filed: Jun. 19, 2009

(65) Prior Publication Data

US 2010/0023846 A1 Jan. 28, 2010

Related U.S. Application Data

(63) Continuation of application No. PCT/CN2007/070898, filed on Oct. 15, 2007.

(30) Foreign Application Priority Data

Dec. 20, 2006 (CN) .......................... 2006 1 0167899

(51) Int. Cl.
*G06F 11/00* (2006.01)

(52) U.S. Cl.
USPC .......................................................... 714/798

(58) Field of Classification Search
USPC .......................................................... 714/798
See application file for complete search history.

(56) References Cited

U.S. PATENT DOCUMENTS 5,440,266 A * 8/1995 Ono .............................. 329/307
5,615,220 A 3/1997 Pharris
5,854,840 A 12/1998 Cannella, Jr.
5,901,158 A 5/1999 Weng et al.
6,954,891 B1 10/2005 Jha
2002/0083392 A1 6/2002 Kim et al.

FOREIGN PATENT DOCUMENTS

CN 1353521 6/2002
CN 1353521 A 6/2002
EP 1916789 A1 4/2008
JP 57060753 4/1982
JP 58201444 11/1983

OTHER PUBLICATIONS

Extended European Search Report in corresponding European Application No. 07817089.1 (Nov. 5, 2010).

1st Office Action in corresponding Chinese Application No. 200780000313.5 (Oct. 9, 2010).

Written Opinion in PCT Application No. PCT/CN2007/070898, mailed Dec. 27, 2007.

* cited by examiner

*Primary Examiner* — Guy Lamarre
(74) *Attorney, Agent, or Firm* — Leydig, Voit & Mayer, Ltd

(57) ABSTRACT

According to methods and apparatuses for performing error detection and error correction for a synchronization frame in embodiments of the present invention, a transmitter acquires a transmitter check sequence according to contents of a synchronization frame sequence; and a receiver acquires a receiver information sequence related to the check sequence. When performing error detection, the receiver acquires a receiver check sequence according to the receiver information sequence and a generator polynomial and determines whether the synchronization frame transmission is valid according to the receiver check sequence and the transmitter check sequence; when performing error correction, the receiver acquires a syndrome sequence according to the receiver information sequence, acquires an error pattern according to the syndrome sequence and acquires a result of error correction according to the error pattern and the receiver information sequence.

8 Claims, 5 Drawing Sheets

510 a transmitter acquires a transmitter information sequence according to the frame structure of a synchronization frame sequence corresponding to the transmitter 520 the transmitter acquires a transmitter check sequence according to the transmitter information sequence and a generator polynomial 530 the receiver acquires a receiver information sequence related to the check sequence according to the frame structure of the synchronization frame sequence from the transmitter 540 the receiver acquires a syndrome sequence according to the transmitter information sequence and acquires an error pattern according to the syndrome sequence 550 the receiver acquires a result of error correction according to the receiver information sequence and the error pattern

METHODS AND APPARATUSES FOR PERFORMING ERROR DETECTION AND ERROR CORRECTION FOR SYNCHRONIZATION FRAME

CROSS-REFERENCE TO RELATED APPLICATIONS

The present application is a continuation of International Patent Application No. PCT/CN2007/070898, filed on Oct. 15, 2007, which claims the benefit of Chinese Patent Application No. 200610167899.1, filed on Dec. 20, 2006, both of which are hereby incorporated by reference in their entireties.

FIELD OF THE TECHNOLOGY

The present invention relates to error detection and error correction technologies for communication contents, and more particularly, to methods and apparatuses for performing error detection for synchronization frames, and a method and an apparatus for performing error correction for synchronization frames.

BACKGROUND OF THE INVENTION

In conventional synchronization technologies, a transmitter transmits to a receiver a super frame including synchronization frames and a data frame. FIG. 1 shows a schematic diagram illustrating a structure of a conventional super frame. As shown in FIG. 1, each of the synchronization frame signals for synchronization transmitted by the transmitter includes two portions. The first portion is a fixed m-bit synchronization (Sync) sequence, and the second portion is an n-bit decreasing index number (Index). In general, the decreasing manner of the Index may be as follows: if the Index of a frame is x, the Index of the next frame is x−1; when the Index decreases to 0, the next frame is the data frame.

The receiver first finds the frame header of the synchronization frame according to the m-bit Sync and then determines whether the current Index is 0. When the current Index is 0, the receiver takes the following contents as the data frame; otherwise, the receiver keeps on receiving the contents in the frame structure until the Index decreases to 0, and then the receiver starts to receive the data frame.

However, there is no solution for processing a synchronization frame, such as performing error detection or error correction for the synchronization frame at present. Therefore, the synchronization frame signal is not protected adequately. In communication, especially in wireless communication, bit error is an ordinary phenomenon because the channel changes rapidly. The bit error in any bit of the n-bit Index results in a synchronization error for the receiver. Therefore, the receiver determines the start position of a data frame incorrectly and then receives the data frame incorrectly. Moreover, the satisfaction of users is obviously reduced.

SUMMARY OF THE INVENTION

Embodiments of the present invention provide methods and apparatuses for performing error detection for a synchronization frame so as to detect whether a synchronization frame from a transmitter is valid and improve the satisfaction of users.

Embodiments of the present invention also provide a method and an apparatus for performing error correction for a synchronization frame so as to perform error correction for a synchronization frame from a transmitter and thus improve the satisfaction of users.

Technical solutions in accordance with the embodiments of the present invention are implemented as follows.

A method for performing error detection for a synchronization frame includes:

acquiring a transmitter check sequence according to contents agreed between a transmitter and a receiver in a synchronization frame sequence; and sending the transmitter check sequence and the synchronization frame sequence to the receiver.

A method for performing error detection for a synchronization frame includes:

receiving a synchronization frame sequence and a transmitter check sequence from a transmitter;

acquiring a receiver check sequence according to contents agreed between the transmitter and a receiver in the received synchronization frame sequence; and determining whether the synchronization frame transmission is valid according to the receiver check sequence and the transmitter check sequence.

An apparatus for performing error detection for a synchronization frame includes:

a first unit, configured to acquire a transmitter check sequence according to contents agreed between a transmitter and a receiver in a synchronization frame sequence; and a second unit, configured to send the transmitter check sequence and the synchronization frame sequence to the receiver.

An apparatus for performing error detection for a synchronization frame includes:

a third unit, configured to receive a synchronization frame sequence and a transmitter check sequence from a transmitter;

a fourth unit, configured to acquire a receiver check sequence according to contents agreed between the transmitter and a receiver in the synchronization frame sequence; and a fifth unit, configured to determine whether the synchronization frame transmission is valid according to the receiver check sequence and the transmitter check sequence.

A method for performing error correction for a synchronization frame, includes:

acquiring a receiver information sequence according to contents agreed between a transmitter and a receiver in a synchronization frame sequence from the transmitter;

acquiring a syndrome sequence according to the receiver information sequence;

acquiring an error pattern according to the syndrome sequence; and acquiring result of error correction according to the error pattern and the receiver information sequence.

An apparatus for performing error correction for a synchronization frame includes:

a sixth unit, configured to acquire a receiver information sequence according to contents agreed between a transmitter and a receiver in a synchronization frame sequence from the transmitter;

a seventh unit, configured to acquire an syndrome sequence according to the receiver information sequence;

a eighth unit, configured to acquire an error pattern according to the syndrome sequence; and a ninth unit, configured to acquire the result of error correction according to the error pattern and the receiver information sequence.

In comparison with conventional technologies, the methods and apparatuses for performing error detection and error correction for the synchronization frame provided by the embodiments of the present invention implement error detection and error correction for the synchronization frame and improve the satisfaction of users.

DETAILED DESCRIPTION OF THE DRAWINGS

Figure 1:
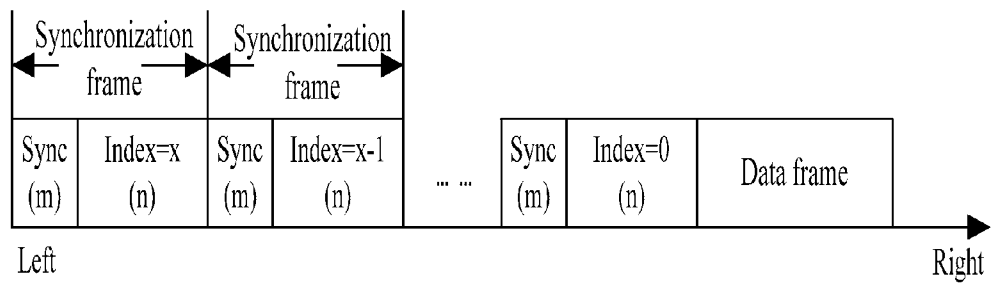
FIG. 1 shows a schematic diagram illustrating a structure of a conventional super frame.

Embodiments of the present invention are described as follows with reference to accompanying drawings.

A method for performing error detection for a synchronization frame in accordance with a preferred embodiment of the present invention includes the following processes: a transmitter acquires a transmitter information sequence according to the frame structure of a synchronization frame sequence created by the transmitter; the transmitter acquires a transmitter check sequence according to the transmitter information sequence and a generator polynomial, and the transmitter transmits the transmitter check sequence to a receiver; the receiver acquires a receiver information sequence related to the transmitter check sequence according to the frame structure of the synchronization frame sequence from the transmitter; the receiver acquires a receiver check sequence according to the receiver information sequence and the generator polynomial; and the receiver determines whether the synchronization frame transmission is valid according to the receiver check sequence and the transmitter check sequence.

An apparatus for performing error detection for a synchronization frame provided in accordance with a preferred embodiment of the present invention includes multipliers, XORs and registers. The number of the multipliers, the XORs, and the registers is the same as the number of bits in a check sequence. The XORs indirectly connect to the registers in series; the output of the register located at the tail end is connected to the inputs of the XORs via the multipliers, and each of the multipliers corresponds to one XOR; coefficients of a generator polynomial are respectively configured in the multipliers located between the XORs and the registers.

A transmitter apparatus for performing error detection for a synchronization frame in accordance with another embodiment of the present invention includes multipliers, XORs, registers and a data transmitting channel connected to all the registers. The number of the multipliers, the XORs and the registers is the same as the number of bits in a check sequence. The XORs are indirectly connected to the registers in a series; the output of the register located at the tail end is connected to the inputs of the XORs via the multipliers, and each of the multipliers corresponds to one XOR; the multipliers located between the XORs and the registers are used for transmitting generator-polynomial coefficients configured therein to the XORs; and the data transmitting channel is used for transmitting the values in the registers to a receiver as a transmitter check sequence.

A receiver apparatus for performing error detection for a synchronization frame in accordance with a preferred embodiment of the present invention includes multipliers, XORs, registers and an error detection comparator connecting to all the registers. The number of the multipliers, the XORs and the registers is the same as the number of bits in a check sequence. The XORs are indirectly connected to the registers in a series; the output of the register located at the tail end is connected to the inputs of the XORs via the multipliers, and each of the multipliers corresponds to one XOR; the multipliers located between the XORs and the registers are used for transmitting generator-polynomial coefficients configured therein to the XORs. The register located at the tail end sends an acquired value to the multipliers connecting to the register; and each of the registers transmits a value acquired finally to the error detection comparator as a bit in a receiver check sequence corresponding to the register. The error detection comparator determines whether the synchronization frame transmission is valid according to a transmitter check sequence from a transmitter and the received receiver check sequence.

A method for performing error correction for a synchronization frame provided in accordance with an preferred embodiment of the present invention includes the following processes: a transmitter acquires a transmitter information sequence according to the frame structure of a synchronization frame sequence created by the transmitter, and then the transmitter acquires a transmitter check sequence according to the transmitter information sequence and a generator polynomial, and the transmitter transmits the transmitter check sequence to a receiver; the receiver acquires a receiver information sequence according to the frame structure of the synchronization frame sequence from the transmitter; the receiver acquires an syndrome sequence according to the receiver information sequence, acquires an error pattern according to the syndrome sequence, and acquires a result of error correction according to the error pattern and the receiver information sequence.

An apparatus for performing error correction for a synchronization frame provided in accordance with an embodiment of the present invention includes registers configured for storing a transmitter information sequence, registers configured for storing a syndrome sequence, registers configured for storing an error pattern, and XORs connecting to the registers configured for storing the error pattern. Wherein, the registers configured for storing the transmitter information sequence connect to XORs, the registers configure for storing the syndrome sequence connect to the registers configured for storing the error pattern via adders and error correction comparators. The registers configured for storing the transmitter information sequence transmits a stored transmitter information sequence to the XORs connecting to the registers configured for storing the transmitter information sequence to generate a syndrome sequence. The registers configured for storing the syndrome sequence stores the syndrome sequence transmitted by the XORs connecting to the registers configured for storing the syndrome sequence, and transmits the stored syndrome sequence to the adders and the error correction comparators to generate an error patter. The registers configured for storing the error pattern stores the error pattern transmitted by the error correction comparators connecting to the registers configured for storing the error pattern, and transmits the stored error pattern to the XORs connecting to the registers configured for storing the error pattern to generate a result of error correction.

Figure 2:
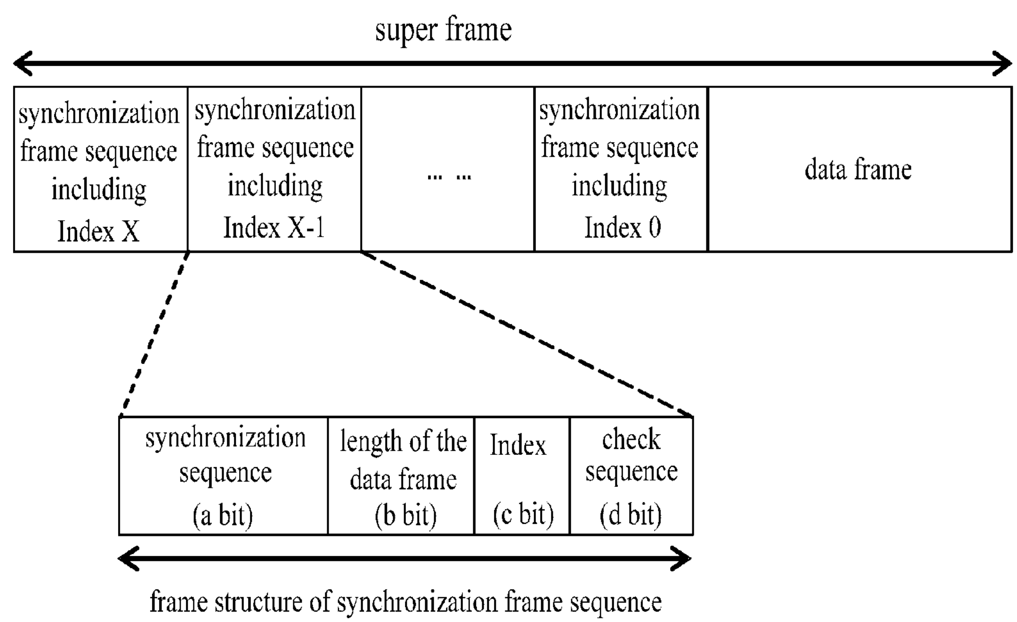
FIG. 2 shows a schematic diagram illustrating a structure of a super frame in accordance with an embodiment of the present invention.

FIG. 2 shows a schematic diagram illustrating a structure of a super frame in accordance with an embodiment of the present invention. With reference to FIG. 2, the super frame includes synchronization frame sequences having different Indexes, and each of the synchronization frame sequences includes four portions. The first portion is a fixed a-bit synchronization sequence (Sync Sequence); the second portion is a b-bit length frame indicating a length of a data frame of the super frame; the third portion is a decreasing c-bit Index; the fourth portion is a d-bit transmitter check sequence (Parity). In general, the decreasing manner of the Index may be as follows: if the Index of a frame is x, the Index of the next frame is x−1; when the Index decreases to 0, the next frame is the data frame of the super frame. In the embodiment of the present invention, a, b, c and d are all natural numbers.

As shown in FIG. 2, new data structures, such as the length frame and the Parity, are added into the super frame in the embodiment of the present invention.

The length frame indicates the length of the data frame included in the current super frame. Therefore, the receiver may acquire the length of the dada frame when receiving the super frame so as to determine the time to be spent on receiving the data frame included in the super frame.

In addition, the Parity in each of the synchronization frame sequences is generated according to the frame structure of the synchronization frame sequence and used for performing error detection for the synchronization frame sequence having the Parity.

In practice, it is unnecessary to limit the number of bits in the length frame and the Parity, and the length frame and the Parity may be arbitrarily configured in any position in the frame structure of the synchronization frame sequence, only if the receiver is capable of successfully acquiring the data frame and the Parity. Moreover, besides the length frame and the Parity, other data structures may also be configured in the synchronization frame sequence.

Figure 3:
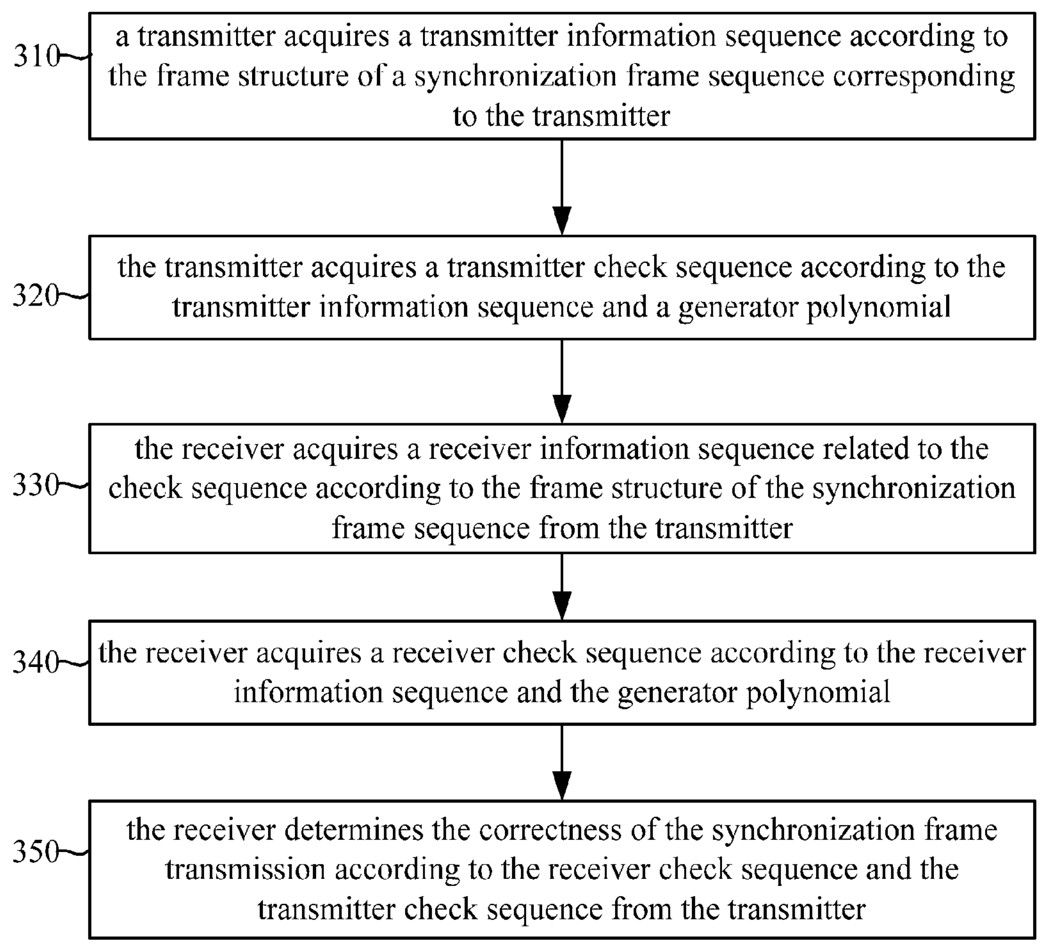
FIG. 3 shows a flow chart illustrating a method for performing error detection for a synchronization frame in accordance with an embodiment of the present invention.

The error detection may be performed after the configuration for the synchronization frame sequence shown in FIG. 2 is done. The detailed error detection process is shown in FIG. 3. FIG. 3 shows a flow chart illustrating a method for performing error detection for a synchronization frame in accordance with an exemplary embodiment of the present invention. The method includes the following processes.

In Step 310, a transmitter acquires a transmitter information sequence according to the frame structure of a synchronization frame sequence.

Specifically, besides a Parity, the frame structure of the synchronization frame sequence includes a Sync Sequence, a length frame and an Index data structure. Therefore, the transmitter information sequence may be acquired according to one or more of the Sync Sequence, the length frame and the Index.

Supposing that the transmitter acquires the transmitter information sequence according to the Sync Sequence, the length frame and the Index included in the frame structure of the synchronization frame sequence corresponding to the transmitter, the value of the transmitter information sequence may be denoted as:

$$u(x)=u_0x^{a+b+c-1}+u_1x^{a+b+c-2}+u_2x^{a+b+c-3}+\ldots u_{a+b+c-2}x+u_{a+b+c-1};$$

here, the parameters such as $u_0$ and $u_1$ are all coefficients of an transmitter information polynomial; specifically, $u_0$ corresponds to the leftmost bit in the Sync Sequence, $u_1$ corresponds to the second bit counting from left to right in the Sync Sequence, the rest may be deduced by analogy, $u_{a-1}$ corresponds to the rightmost bit in the Sync Sequence, $u_a$ corresponds to the leftmost bit in the sequence of the length frame and $u_{a+b+c-1}$ corresponds to the rightmost bit in the sequence of the Index.

In Step 320, the transmitter acquires a transmitter check sequence according to the transmitter information sequence and a generator polynomial.

Specifically, the generator polynomial is a polynomial predetermined according to the number of bits in the check sequence, and the generator polynomial is denoted as:

$$g(x)=g_0x^p+g_1x^{p-1}+g_2x^{p-2}+\ldots g_{p-1}x+g_p.$$

where the parameters such as $g_0$ and $g_1$ all are the coefficients of the generator polynomial, and p is the number of bits in the check sequence.

The transmitter check sequence acquired by the transmitter according to the transmitter information sequence and the generator polynomial is denoted as:

$$p(x)=[u(x)x^p]\%g(x).$$

The transmitter may add the acquired transmitter check sequence into the Parity portion of the synchronization frame sequence, and then transmit the synchronization frame sequence having the transmitter check sequence to the receiver.

The g(x) adopted in the above operation may be any generator polynomial and may be a primitive polynomial in general. Different demands for the length of the synchronization frame may lead to different demands for the length of the Parity, and then the primitive polynomial having the length corresponding to the length of the Parity may be adopted. For example, when the demanded length of the Parity is 10, $x^{10}+x^3+1$ may be taken as the generator polynomial.

The transmitter also may acquire the transmitter information sequence according to other data structures included in the frame structure of the synchronization frame sequence corresponding to the transmitter in practice. For example, the transmitter may acquire the transmitter information sequence according to the length frame and the Index:

$$u(x)=u_0x^{b+c-1}+u_1x^{b+c-2}+u_2x^{b+c-3}+\ldots u_{b+c-2}x+u_{b+c-1}.$$

In Step 330, the receiver acquires a receiver information sequence related to the check sequence according to the frame structure of the synchronization frame sequence from the transmitter.

Specifically, the synchronization frame received by the receiver includes the Sync Sequence, the length frame, the Index and the Parity. Because the transmitter acquires the transmitter information sequence according to the Sync Sequence, the length frame and the Index, the receiver may regard the Sync Sequence, the length frame and the Index as the contents of the information sequence related to the check sequence. Therefore, the receiver acquires the contents of the information sequence related to the check sequence from the received synchronization frame, i.e. the Sync Sequence, the length frame and the Index, and then the receiver acquires the receiver information sequence according to the acquired Sync Sequence, the length frame and the Index. The method for acquiring the receiver information sequence is the same as that for acquiring the transmitter information sequence described above.

The content of the information sequence related to the check sequence needs to be configured in the transmitter and the receiver in advance to ensure that the error detection process can be performed successfully.

In Step 340, the receiver acquires a receiver check sequence according to the receiver information sequence and the generator polynomial. The method adapted at this block is the same as that in Step 320.

In Step 350, the receiver determines whether the synchronization frame transmission is valid according to the receiver check sequence, and the transmitter check sequence acquired from the transmitter.

Specifically, the receiver may acquire the transmitter check sequence from the synchronization frame transmitted by the transmitter, and then the receiver may compare the acquired transmitter check sequence with the acquired receiver check sequence to determine whether the transmitter check sequence and the receiver check sequence are identical; when the transmitter check sequence and the receiver check sequence are identical, the receiver determines that the synchronization frame is transmitted correctly; otherwise, the receiver determines that the synchronization frame is transmitted incorrectly.

When determining that the synchronization frame is transmitted correctly, the receiver may further acquire the Index in the synchronization frame, and determine when the Index decreases to 0 according to the decreasing property of the Index, so as to receive the next data frame when the Index decreases to 0. Moreover, the receiver may further acquire the length of the data frame according to the length frame in the synchronization frame, and determine the time needed in receiving the data frame accordingly.

When determining that the synchronization frame is transmitted incorrectly, the receiver may not process the synchronization frame received currently, but keep on receiving the next synchronization frame and perform the error detection for the received synchronization frame. In this case, the detailed method for performing the error detection used by the receiver includes Steps 330 to 350.

Figure 4:
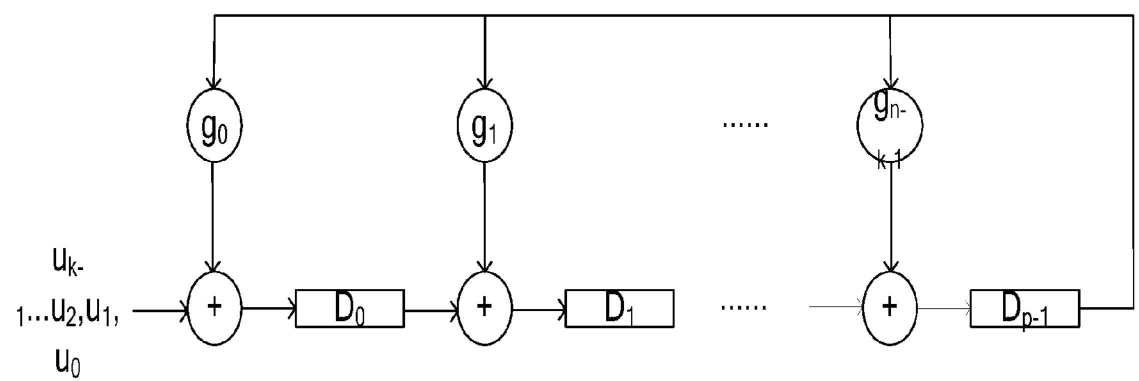
FIG. 4 shows a schematic diagram illustrating an apparatus for implementing the flow shown in FIG. 3.

The apparatus shown in FIG. 4 is needed to implement the flow shown in FIG. 3 successfully. FIG. 4 shows a schematic diagram illustrating an apparatus for implementing the flow shown in FIG. 3.

The error detecting apparatus shown in FIG. 4 may be configured in a transmitter or a receiver. The error detecting apparatus includes multipliers, XORs and registers the number of which is the same as the number of bits in a check sequence. The XORs are indirectly connected to the registers in a series, i.e. an output of a first XOR located at the head end is connected to an input of register 0; an output of register 0 is connected to an input of a second XOR; an output of the second XOR is connected to an input of register 1, . . . , the rest may be deduced by analogy; and an input of register located at the tail end is connected to an output of an anterior XOR.

In addition, an output of the register located at the tail end is connected to inputs of the XORs via the multipliers, and each of the multipliers corresponds to one XOR. The multiplier, which is connected to the XOR located at the head end, may be called the head end multiplier while the multiplier connected to the tail-end XOR may be called the tail end multiplier. The coefficients of the generator polynomial such as $g_0$, $g_1$, . . . , and $g_{n-k-1}$ are respectively configured in the multipliers from the head end to the tail end.

In practice, all the registers is first cleared to 0 in general, and then the acquired information sequence, $u_0, u_1 \ldots u_{k-1}$, is inputted to the XORs in turn from the XOR located at the head end; here, the information sequence is a transmitter information sequence when the error detecting apparatus is located in the transmitter while the information sequence is a receiver information sequence when the error detecting apparatus is located in the receiver. When the contents of the information sequence are different, the value of k may also be different. For example, k=a+b+c or k=b+c.

Once a portion of the information sequence is inputted, each of the registers acquires a value accordingly, and the register located at the tail end transmits the acquired value to each of the multipliers; for each of the multipliers, the value from the register is multiplied by the coefficient of the generator polynomial configured in the multipliers, and then the product are sent to the XORs connecting to the multipliers respectively; therefore, when receiving the next coefficient of the information sequence, the XOR can perform an XOR operation between the received product and the received coefficient.

When the calculation for the portion of the information sequence inputted last is accomplished, each of the registers acquires a value finally. The sequence including the final values of all the registers is the check sequence. When the error detecting apparatus is located in the transmitter, each of the registers transmits the acquired value to the data transmission channel connecting to the register, and then the data transmission channel transmits the final values received from all the registers to the receiver as the transmitter check sequence; when the error detecting apparatus is located in the receiver, each of the registers transmits the acquired value to the error detection comparator connecting to the register as the receiver check sequence, and then the error detection comparator compares the transmitter check sequence received from the transmitter with the receiver check sequence received from all the registers to determine whether the synchronization frame transmission is valid.

Specifically, the error detection comparator determines whether the transmitter check sequence is identical with the receive check sequence; when the transmitter check sequence is identical with the receive check sequence, the error detection comparator determines that the synchronization frame is transmitted correctly; otherwise, the error detection comparator determines that the synchronization frame is transmitted incorrectly.

In addition, the error detection comparator may further be connected to a data receiving unit and notify the data receiving unit when determining that the synchronization frame is transmitted correctly. And then the data receiving unit acquires the Index and the length of the data frame in the synchronization frame transmitted correctly, determines the time to be spent in receiving the data frame according to the acquired Index, determines the time needed for receiving the data frame according to the length of the data frame, and receives the data frame according to the determined time to be spent on receiving the data frame and the determined time needed for receiving the data frame.

In practice, the XOR located at the head end is connected to the data receiving unit in general and used for receiving the information sequence from the data receiving unit.

As can be seen from the above description, the schemes described in FIGS. 3 and 4 may perform error detection for the synchronization frame and thus determine whether the synchronization frame from the transmitter is valid. Moreover, the length of the data frame is also shown in FIG. 2, so the time needed for receiving the data frame can be determined flexibly.

Figure 5:
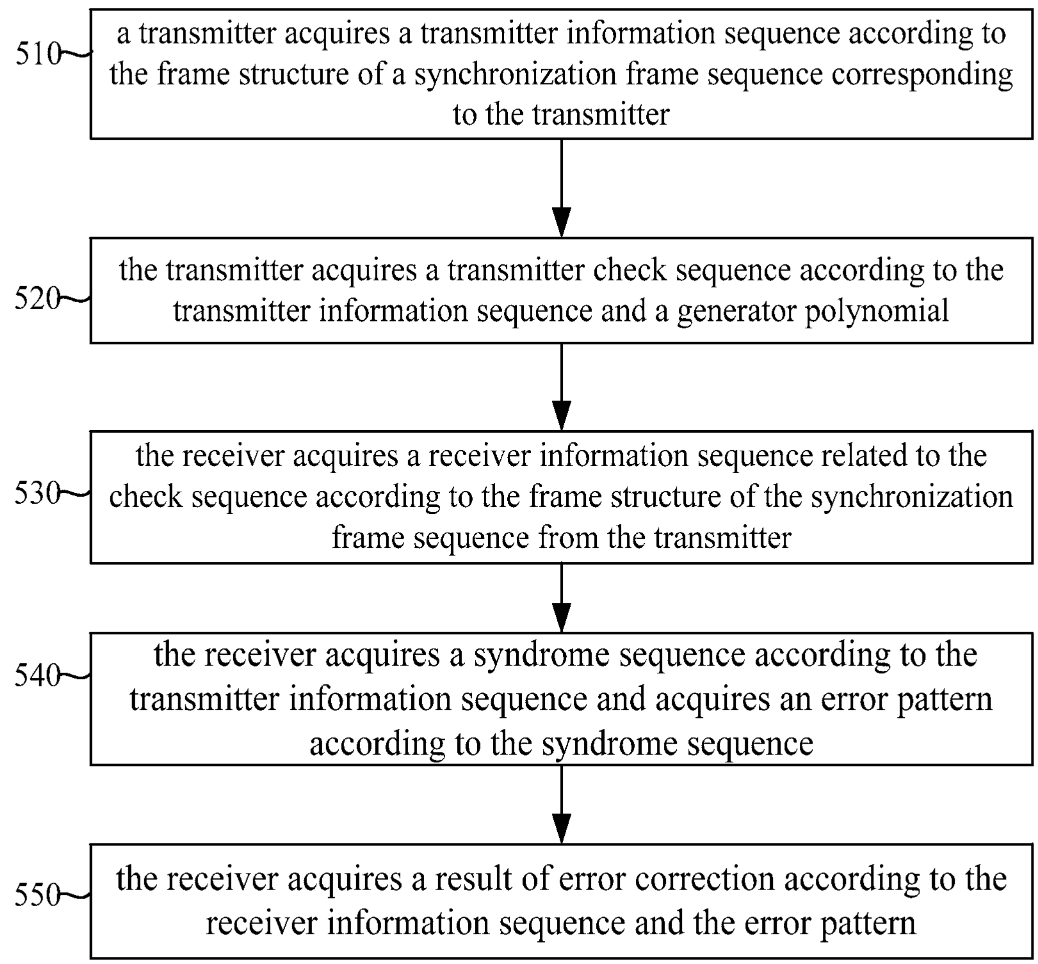
FIG. 5 shows a flow chart illustrating a method for performing error correction for a synchronization frame in accordance with an embodiment of the present invention.

In practice, besides the above error detection that may be performed for the synchronization frame, error correction also may be performed for the synchronization frame. FIG. 5 shows a flow chart illustrating a method for performing error correction for a synchronization frame in accordance with a preferred embodiment of the present invention. The method includes the following processes:

In Steps 510 to 530, a transmitter acquires a transmitter information sequence according to the frame structure of a synchronization frame sequence corresponding to the transmitter, and then the transmitter acquires a transmitter check sequence according to the transmitter information sequence and a generator polynomial; then the transmitter adds the acquired transmitter check sequence into the data structure having the Parity and transmits the synchronization frame having the transmitter check sequence to a receiver.

The receiver acquires a receiver information sequence related to the check sequence according to the frame structure of the synchronization frame sequence from the transmitter.

The detailed method for performing Steps 510 to 530 is the same as that for performing Steps 310 to 330. But it is to be noted that in practice the transmitter information sequence is acquired according to the length frame and the Index generally so as to ensure the quality of the error correction. The value of the transmitter information sequence is $$u(x)=u_0x^{b+c-1}+u_1x^{b+c-2}+u_2x^{b+c-3}+\ldots u_{b+c-2}x+u_{b+c-1};$$

wherein, $u_0$ corresponds to the leftmost bit in the length of the data frame, $u_1$ corresponds to the second bit counting from left to right in the length of the data frame, the rest may be deduced by analogy, $u_{b-1}$ corresponds to the rightmost bit in the length of the data frame, $u_b$ corresponds to the leftmost bit in the sequence of the Index and $u_{b+c-1}$ corresponds to the rightmost bit in the sequence of the Index.

In general, the generator polynomial in the above case is $$g(x)=x^8+x^7+x^6+x^4+1.$$

In Step 540, the receiver acquires a syndrome sequence according to the transmitter information sequence and acquires an error pattern according to the syndrome sequence.

In this preferred embodiment, the information sequence according to which the receiver acquires the syndrome sequence is related to the check sequence. The “related to” described above has the same meaning as the “related to” described in Step 330. Supposing that the transmitter acquires the transmitter information sequence according to the length frame and the Index, the sequence received by the receiver may be configured as $\vec{r}'=(r'_0, r'_1 \ldots r'_{b+c+p-1})$. If the number of bits in $\vec{r}'$ is smaller than the predetermined number of bits, $\vec{r}'$ needs to be extended; here, the method for extending $\vec{r}'$ includes filling the first N−(b+c+p) bits of $\vec{r}'$ with 0, and thus $\vec{r}'$ is changed into the following form:

$$\vec{r}=(r_0,r_1,\ldots r_{N-1})=0,0,\ldots 0,r'_0,r'_1\ldots r'_{b+c+p-1}).$$

If the number of bits in $\vec{r}'$ is eligible, $\vec{r}'$ does not need to be extended and may be taken as the $\vec{r}$ to be used in the following processing.

Next, the syndrome sequence, $\vec{s}=(s_0, s_1 \ldots s_{N-1})$, is calculated according to $\vec{r}$, where each $s_i$ is the module-2 sum of some $r_{i_1}$, $r_{i_2}$, $r_{i_3}$, $r_{i_4}$. When the calculation is performed, the module-2 sum of four values in $\vec{r}$ is calculated every time to acquire one value in the $\vec{s}$. Such calculation is performed for N times until all the N values in $\vec{s}$ are acquired, where N is the number of bits in $\vec{r}$ having the predetermined number of bits. In practice, the four values in $\vec{r}$ selected to generate a corresponding $s_i$ in $\vec{s}$ are determined by a given rule.

Next, the error pattern, $\vec{e}=(e_0, e_1 \ldots e_{N-1})$, is calculated according to the acquired syndrome sequence $\vec{s}$.

When $\vec{e}=(e_0, e_1 \ldots e_{N-1})$ is calculated, an index set, $A(i)=\{j_1, j_2, \ldots j_4\}$, needs to be determined for each $e_i$ first, where each $j_x$ is the index of a line in check matrix H, the ith element of the line is 1. Next, the receiver determines whether the number of bits with a value of 1 in the $s_{j_1}, s_{j_2}, \ldots, s_{j_4}$ is larger than half of total number of the bits; if yes, the receiver end determines that $e_i=1$; otherwise, the receiver end determines that $e_i=0$.

In Step 550, the receiver acquires a result of error correction according to the receiver information sequence and the error pattern.

Specifically, the receiver performs module-2 adding for the received $\vec{r}$ and the calculated error pattern to acquire a decoding output sequence, $\vec{z}=(\vec{r}+\vec{e})\%2$, and takes the decoding output sequence as the result of the error correction.

Next, the receiver may further determine whether the result of the error correction is valid. The detailed method for determining whether the result of the error correction is valid generally includes the following processes. The receiver calculates $\vec{z}H^T$ according to the acquired $\vec{z}$, determines whether the calculation result is a null sequence; if yes, the receiver determines that the result of the error correction is correct and the error correction performed for the synchronization frame is successful; otherwise, the receiver end determines that the result of the error correction is incorrect and the error correction performed for the synchronization frame fails.

Figure 6:
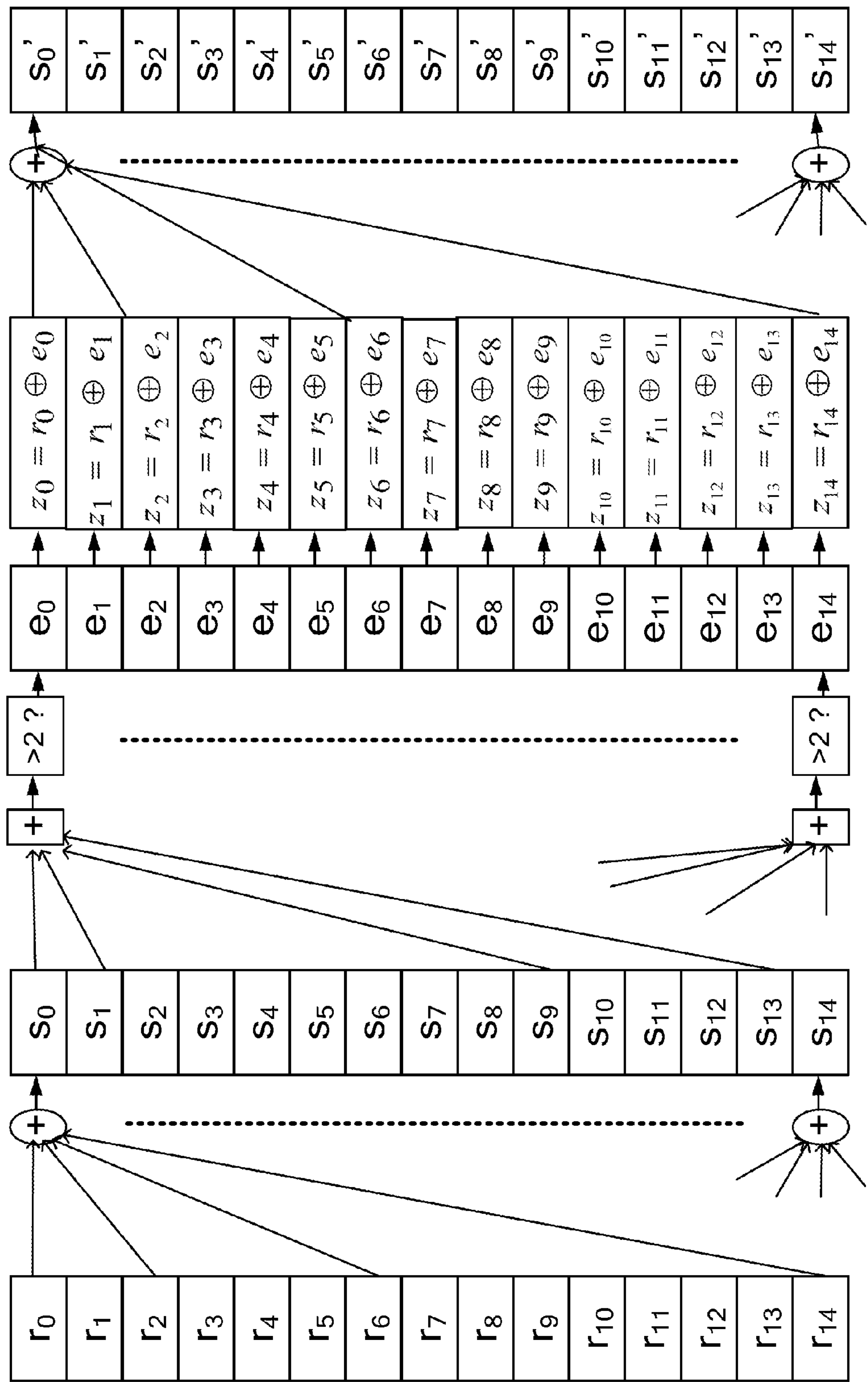
FIG. 6 shows a schematic diagram illustrating an apparatus for implementing the flow shown in FIG. 5.

FIG. 6 shows a schematic diagram illustrating an apparatus in accordance with an exemplary embodiment of the present invention for implementing the flow shown in FIG. 5. Moreover, $\vec{r}$ having 15 bits is taken as an example in the description in FIG. 6.

As shown in FIG. 6, the bits (from $r_0$ to $r_{14}$) included in the $\vec{r}$ received by the receiver are respectively stored in the registers.

In general, some four registers storing one value of $\vec{r}$ respectively transmit the values stored by the registers to an XOR every time; and the XOR transmits the result of the XOR operation to a register; and then the register stores the received value as $s_i$ (the value of i ranging from 0 to 14). The above operation is performed 15 times concurrently until all the values of $\vec{s}$ are stored by the registers.

Next, some four registers storing one value of $\vec{s}$ respectively transmit the values stored by the registers to an adder every time, and the adder transmits the result of the logical add operation to an error correction comparator; and then the error correction comparator determines whether the number of values with a value of 1 in the received values is larger than half of total number of the values and transmits the result of the determination to a register. The register stores the received value as $e_i$ (the value of i ranging from 0 to 14). The above operation is performed 15 times concurrently until all the values of $\vec{e}$ are stored by the registers.

Next, the registers storing the value of $\vec{e}$ and the registers storing the value of $\vec{r}$ transmit the stored values to XORs (not shown in the figure) and the XORs perform XOR operations for the values with the corresponding bit position in $\vec{e}$ and $\vec{r}$; for example, the XORs perform an XOR operation for $r_0$ and $e_0$, $r_1$ and $e_1$, etc. And then the XORs transmit the acquired results of the operation to registers as the result of the error correction, $\vec{z}$, to be stored.

Finally, some four registers storing the value of $\vec{z}$ may also respectively transmit the values stored by the registers to an XOR every time. The XOR transmits the result of the XOR operation to a register which may be called a check register; and then the register store the received value as $s'_i$ which may be called as a check result and the value of i ranging from 0 to 14. The above operation is performed 15 times concurrently until all the values of $\vec{s}'$ are stored. The registers storing the value of $\vec{s}'$ may transmit the stored values of $\vec{s}'$ to a check comparator (not shown in the figure) after acquiring all the values of $\vec{s}'$. The check comparator determines that the error correction performed for the synchronization frame is successful if all the received values are 0. Otherwise, the check comparator determines that the error correction performed for the synchronization frame fails.

From the above description, the schemes described in FIGS. 5 and 6 may implement error correction for the synchronization frame and thus efficiently improve the satisfaction of users.

To sum up, the methods and apparatuses for performing error detection and error correction for a synchronization frame in accordance with the embodiments of the present invention may respectively implement error detection and error correction for the synchronization frame and thus improve the satisfaction of users.

The invention claimed is:

1. A method for performing error correction for a synchronization frame, comprising:

acquiring a receiver information sequence according to a frame structure of the synchronization frame sequence from a transmitter acquiring a syndrome sequence according to the receiver information sequence;

acquiring an error pattern according to the syndrome sequence; and acquiring result of error correction according to the error pattern and the receiver information sequence, wherein the syndrome sequence is $\vec{S}=(s_0, s_1 \ldots s_{N-1})$, and the acquiring a syndrome sequence according to the receiver information sequence comprising:

calculating the module-2 sum of four predetermined values in the receiver information sequence $\vec{r}$ every time to acquire one value in $\vec{S}$, and performing the calculation for N times to acquire the N values in the $\vec{s}$; wherein N is a natural number and equals to the number of the bits in $\vec{r}$ the error pattern is $\vec{e}=(e_0, e_1 \ldots e_{N-1})$, and the acquiring the error pattern comprises:

determining an index set, $A(i)=\{j_1, j_2, \ldots j_4\}$, for each $e_i$; where each $j_x$ is the index of a line in a check matrix, H, and element i of the line is 1;

determining whether the number of bits with a value of 1 in the $s_{j_1}, s_{j_2} \ldots, s_{j_4}$ in the syndrome sequence, $\vec{S}=(s_0, s_1 \ldots s_{N-1})$ is larger than half of total number of the bits; and determining that $e_i=1$ when the number of bits with a value of 1 in the $s_{j_1}, s_{j_2}, \ldots, s_{j_4}$ in the syndrome sequence, $\vec{S}=(s_0, s_1 \ldots S_{N-1})$ is larger than half of total number of the bits; or determining that $e_i=0$ when the number of bits with a value of 1 in the $s_{j_1}, s_{j_2} \ldots, s_{j_4}$ in the syndrome sequence, $\vec{S}=(s_0, s_1 \ldots s_{N-1})$ is less than or equal to half of total number of the bits, the acquiring the result of the error correction comprises:

performing module-2 adding for the receiver information sequence, $\vec{r}$, the calculated error pattern, $\vec{e}$; and taking the acquired $\vec{z}=(\vec{r}+\vec{e}$ %2 as the result of the error correction.

2. The method of claim 1, wherein the frame structure of the synchronization frame sequence from a transmitter comprises at least one of a length frame and an index number (Index); the length frame is B bits in length, the Index is C bits in length; and the receiver information sequence is acquired according to the following formula:

$$\vec{r}=u(x)'=u_0x^{e-1}+u_1x^{e-2}+u_2x^{e-3}+\ldots u_{e-2}x+u_{e-1},$$

wherein B and C are natural numbers; u is the bit value of the preconfigured contents in the synchronization frame sequence; and d is the sum of at least one of B and C.

3. The method of claim 2, further comprising: extending the number of bits in $\vec{r}$ a predetermined number of bits.

4. The method of claim 1, further comprising:

calculating $\vec{z}H^T$ according to the acquired result of the error correction, $\vec{z}$, wherein H is a check matrix;

determining whether the result of the calculation is a null sequence; and determining that the result of the error correction is correct when the result of the calculation is a null sequence; or determining that the result of the error correction is incorrect when the result of the calculation is not a null sequence.

5. The method of claim 1, wherein the frame structure of the synchronization frame sequence comprises content generated according to the following formula:

$$p(x)=[u(x)x^p]\%g(x);$$

wherein g(x) is a predetermined generator polynomial; p(x) is a transmitter check sequence; u(x) is a transmitter information sequence generated by the transmitter according to the frame structure of a synchronization frame sequence; and p is the number of bits in the transmitter check sequence.

6. An apparatus for performing error correction for a synchronization frame comprising:

a sixth unit, configured to acquire a receiver information sequence according to a frame structure of the synchronization frame sequence from a transmitter;

a seventh unit, configured to acquire a syndrome sequence according to the receiver information sequence;

a eighth unit, configured to acquire an error pattern according to the syndrome sequence; and a ninth unit, configured to acquire the result of error correction according to the error pattern and the receiver information sequence, wherein the seventh unit comprises:

a first XOR group, configured to generate the syndrome sequence; wherein each XOR in the first XOR group performs an XOR operation for the values stored by four predetermined registers in the first register group and generates a bit in the syndrome sequence corresponding to the XOR; and a second register group, configured to store the syndrome sequence; wherein each register in the second register group stores a bit in the syndrome sequence corresponding to the register, wherein the eighth unit comprises:

an adder group configured to perform an add operations for the syndrome sequence; wherein each adder in the adder group performs an add operation for the values stored by four predetermined registers in the second register group and generates a result of the add operation;

an error correction comparator group, configured to generate the error pattern;

wherein each error correction comparator in the error correction comparator group determines a bit in the error pattern corresponding to the error correction comparator according to the result of the add operation of the adder corresponding to the error correction comparator and a third register group, configured to store the error pattern; wherein each register in the third register group stores a bit in the error pattern corresponding to the register, the ninth unit comprises:

a second XOR group, configured to generate the result of the error correction;

wherein each XOR in the second XOR group performs an XOR operation for the value stored by one register corresponding to the XOR in the first register group and the value stored by one register corresponding to the XOR in the second register group; and generates a bit in the result of the error correction corresponding to the XOR; and a fourth register group, configured to store the result of the error correction; wherein each register in the fourth register group stores a bit in the result of the error correction corresponding to the register.

7. The apparatus of claim 6, wherein the sixth unit comprises:

a first register group, configured to store the receiver information sequence; wherein each register in the first register group stores a bit in the receiver information sequence corresponding to the register.

8. The apparatus of claim 6, further comprising:

a third XOR group, configured to generate a check result; wherein each XOR in the third XOR group performs an XOR operation for the values stored by four predetermined registers in the fourth register group and generates a bit in the check result corresponding to the XOR;

a fifth register group, configured to store the check result; wherein each register in the fifth register group stores a bit in the check result corresponding to the register; and a check comparator, configured to determine whether the result of the error correction is valid according to the value stored by each of the register in the fifth register group.

* * * * *

UNITED STATES PATENT AND TRADEMARK OFFICE

CERTIFICATE OF CORRECTION

PATENT NO. : 8,448,055 B2
APPLICATION NO. : 12/488341
DATED : May 21, 2013
INVENTOR(S) : Yuchun Wu It is certified that error appears in the above-identified patent and that said Letters Patent is hereby corrected as shown below:

In the Claims:

Column 12, line 10, " $\vec{z} = (\vec{r} + \vec{e}\%2$ " should read -- $\vec{z} = (\vec{r} + \vec{e})\%2$ --.

Column 12, lines 20-21,

" $\vec{r} = u(x)' = u_0 x^{e-1} + u_1 x^{e-2} + u_2 x^{e-3} + \cdots u_{e-2} x + u_{e-}$ 1, "

should read

-- $\vec{r} = u(x)' = u_0 x^{e-1} + u_1 x^{e-2} + u_2 x^{e-3} + \cdots u_{e-2} x + u_{e-1}$, --.

Column 12, line 28, " $\vec{z}//T$ " should read -- $\vec{z}H^T$ --.

Signed and Sealed this
Thirteenth Day of August, 2013

Teresa Stanek Rea
*Acting Director of the United States Patent and Trademark Office*